United States Patent

Nakamoto et al.

(10) Patent No.: US 7,052,425 B2
(45) Date of Patent: May 30, 2006

(54) POWER TRANSMISSION BELT AND BELT DRIVE SYSTEM WITH THE SAME

(75) Inventors: Yuji Nakamoto, Hyogo (JP); Hideaki Kawahara, Hyogo (JP); Katsuyoshi Fujiwara, Hyogo (JP); Tomoaki Suzuki, Aichi (JP)

(73) Assignee: Bando Chemical Industries, Ltd., Hyogo (JP)

( * ) Notice: Subject to any disclaimer, the term of this patent is extended or adjusted under 35 U.S.C. 154(b) by 108 days.

(21) Appl. No.: 10/673,222

(22) Filed: Sep. 30, 2003

(65) Prior Publication Data

US 2004/0063532 A1 Apr. 1, 2004

(30) Foreign Application Priority Data

Sep. 30, 2002 (JP) .............................. 2002-287310

(51) Int. Cl.
*F16G 1/04* (2006.01)
(52) U.S. Cl. .................................... 474/237
(58) Field of Classification Search ............... 474/237, 474/260, 266, 267; 139/383 R
See application file for complete search history.

(56) References Cited

U.S. PATENT DOCUMENTS 2,519,590 A 8/1950 Mitchell 5,840,636 A * 11/1998 Mitsutsuka et al. ......... 442/361
5,954,606 A * 9/1999 Mishima et al. ............ 474/267

FOREIGN PATENT DOCUMENTS

| DE | 40 27 113 A1 | 3/1992 |
| GB | 852190 | 10/1960 |
| JP | 61-56310 | 4/1986 |
| JP | 8-82346 | 3/1996 |
| JP | 10-9344 | 9/1998 |
| JP | 2002-235805 | 8/2002 |

OTHER PUBLICATIONS

European Search Report dated Dec. 16, 2004 in corresponding European Patent Application No. EP 03 01 8494.
Notice of Reasons of Rejection dated Jun. 21, 2005 in corresponding Japanese patent Application No. 2002-287310.

* cited by examiner

*Primary Examiner*—Vicky A. Johnson
(74) *Attorney, Agent, or Firm*—Nixon Peabody LLP (57) ABSTRACT

A power transmission belt is formed so that the back face side of a belt body is covered with a reinforced fabric woven with warps and wefts. In the reinforced fabric, the direction of warps and the direction of wefts make equal angles with the belt widthwise direction, and each of two directions of consecutive yarn intersections of the warps and wefts formed to stand out from the belt surface makes a certain angle with the belt widthwise direction.

6 Claims, 9 Drawing Sheets

PRIOR ART

POWER TRANSMISSION BELT AND BELT DRIVE SYSTEM WITH THE SAME

BACKGROUND OF THE INVENTION (a) Field of the Invention

This invention relates to power transmission belts and belt drive systems with the same.

(b) Description of the Prior Art

Figure 11:
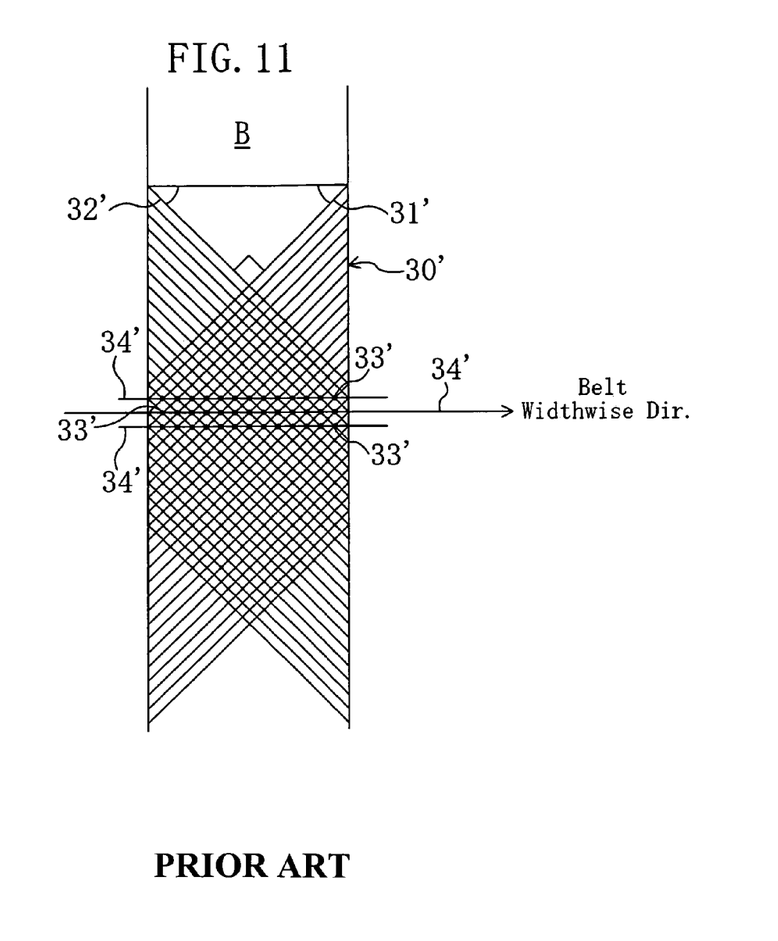
FIG. 11 is a schematic front view of the back face of a conventional V-ribbed belt.

V-ribbed belts are power transmission belts combining the flexibility of flat belts and the high power transmission capacity of V-belts, and are widely used, for example, as automotive accessory drive belts. In a V-ribbed belt of such kind, in order to allow it to withstand a side pressure and enhance the resistance of the back face part to vertical cracking, the back face side of the belt body is covered with a plainly woven reinforced fabric. In the V-ribbed belt, as shown in FIG. 11, the reinforced fabric 30' is normally disposed at the belt back face so that the directions of warps 31' and wefts 32' form equal angles with the widthwise direction of the belt.

In recent years, as belt drive systems for driving automotive accessories, serpentine drive type ones have been increasingly employed which drive a single V-ribbed belt wound about multiple pulleys. In some of such serpentine belt drive systems, in order to accommodate a V-ribbed belt even in their complicated layout, at least one of the multiple pulleys is formed of a flat pulley that makes contact with the belt back face.

When a flat pulley making contact with the belt back face is used, however, there arises a problem that abnormal noises occur between the belt back face and the flat pulley. In the conventional V-ribbed belt, as shown in FIG. 11, the plainly woven reinforced fabric 30' is disposed at the belt back face so that the directions of warps 31' and wefts 32' form equal angles with the belt widthwise direction. As a result, yarn intersections 33' of the warps and wefts which stand out from the belt surface form lines of bulges 34' extending in the belt widthwise direction, and the lines of bulges 34' are arranged at even intervals in the belt lengthwise direction. Therefore, the lines of bulges 34' each formed by consecutive yarn intersections 33' in the belt widthwise direction periodically beat the flat pulley to produce abnormal noises.

A technique for solving the above problem is disclosed in Japanese Unexamined Patent Publication No. 2002-235805. In this technique, at least either the wefts or warps of the reinforced fabric are arranged at uneven intervals to locate the yarn intersections of the wefts and warps at uneven intervals in the belt lengthwise direction. Thus, the frequency of vibratile forces of the pulley in contact with the reinforced fabric is dispersed to reduce the peak vibration intensity. Further, in the technique, the angles of arrangement of the wefts and warps of the reinforced fabric with respect to the belt lengthwise direction are made different from each other to reduce the interval of the yarn intersections in the belt lengthwise direction. Thus, the frequency of vibratile forces of the pulley in contact with the reinforced fabric becomes a high frequency departing from the audio frequency range, thereby suppressing noises.

SUMMARY OF THE INVENTION

An object of the present invention is to provide a power transmission belt that can suppress production of abnormal noises between the belt back face and the flat pulley and does not cause side tracking during belt run, and also to provide a belt drive system with the same.

To attain the above object, in the present invention, each of two directions of consecutive yarn intersections of the warps and wefts formed to stand out from the belt surface, i.e., each of the directions in which lines of bulges formed of the yarn intersections extend, makes a certain angle with the belt widthwise direction. Thus, the lines of bulges make gradual contact in their lengthwise directions with the flat pulley to prevent the lines of bulges from periodically beating the flat pulley, which prevents the occurrence of abnormal noises between the belt back face and the flat pulley. Furthermore, the reinforced fabric is disposed at the belt back face so that the directions of each warp and weft make equal angles with the belt widthwise direction. Therefore, the action of the belt traveling in the direction of the warps and the action of the belt traveling in the direction of the wefts counteract each other, thereby preventing the occurrence of belt side tracking.

More specifically, in a power transmission belt aiming toward attainment of the above object, the back face side of a belt body is covered with a reinforced fabric woven with warps and wefts. Furthermore, in the reinforced fabric, the direction of warps and the direction of wefts make equal angles with a widthwise direction of the belt, and each of two directions of consecutive yarn intersections of the warps and wefts formed to stand out from the belt surface makes a certain angle with the widthwise direction of the belt.

When each of the directions in which lines of bulges formed of the consecutive yarn intersections extend makes a certain angle with the belt widthwise direction, there arises no abnormal noises that would occur, previously, in the case where the direction in which the lines of bulges extend matched the belt widthwise direction. Furthermore, as the angle that the direction of the lines of bulges makes with the belt widthwise direction is increased, the lines of bulges have a stronger tendency to make gradual contact in their lengthwise directions with the flat pulley, whereby the contact is made more smoothly and therefore sounds themselves during belt run can be suppressed to a smaller extent. To be more specific, as shown in Test Evaluations described later, the smaller one of the angles that the two directions of the lines of bulges make with the belt widthwise direction is preferably 5° or more. When this angle exceeds 20°, there arises an inconvenience that belt side tracking during belt run is increased.

Therefore, in the power transmission belt, it is preferable that between the angles that the two directions of consecutive yarn intersections of the warps and wefts formed to stand out from the belt surface make with the widthwise direction of the belt, the smaller angle is 5° to 20° inclusive.

Herein, when consecutive yarn intersections exist in only one direction, the angle that the direction of the consecutive yarn intersections makes with the widthwise direction of the belt means the above smaller angle.

In order to allow the direction of the lines of bulges to make a certain angle with he belt widthwise direction when the direction of warps and the direction of wefts make equal angles with the belt widthwise direction, it is conceivable that, for example, a woven fabric in which warps are different in yarn density from wefts or a rib weave fabric is used as the reinforced fabric.

Therefore, in the power transmission belt, the reinforced fabric may be formed of a woven fabric in which warps are different in yarn density from wefts.

Alternatively, in the power transmission belt, the reinforced fabric may be formed of a rib weave fabric.

The flexural property of the belt is susceptible to the directions of warps and wefts constituting the woven fabric. To be more specific, as the directions in which the warps and wefts run in the fabric approach the belt lengthwise direction, the belt stiffness becomes higher. Thus, increased bending loss provides reduced power transmission efficiency and increased heat production, resulting in low flexural fatigue resistance. In order to ensure the proper, low flexural stiffness, it is desirable that each of the angles that the direction of warps and the direction of wefts make with the widthwise direction of the belt is smaller than 40°.

Therefore, in the power transmission belt, each of the angles that the direction of warps and the direction of wefts make with the widthwise direction of the belt is preferably smaller than 40°.

No special limitation is imposed on the type of the power transmission belt. For example, the power transmission belt may be a V-belt or a V-ribbed belt. However, a V-ribbed belt is normally used in a serpentine drive with a flat pulley making contact with the belt back face.

Therefore, the power transmission belt is suitable when the belt body is a body of a V-ribbed belt.

A belt drive system to which the above power transmission belt is applied may be one in which the power transmission belt is wound around a plurality of pulleys and at least one of the plurality of pulleys is formed of a flat pulley that makes contact with the belt back face. According to such a belt drive system, production of abnormal noises can be suppressed effectively.

BRIEF DESCRIPTION OF THE DRAWINGS

Other objects, features and advantages will become apparent from the following detailed description with reference to the accompanying drawings.

DETAILED DESCRIPTION OF THE PREFERRED EMBODIMENTS

Hereinafter, preferred embodiments of the present invention will be described in detail with reference to the drawings.

Embodiment 1

Figure 1:
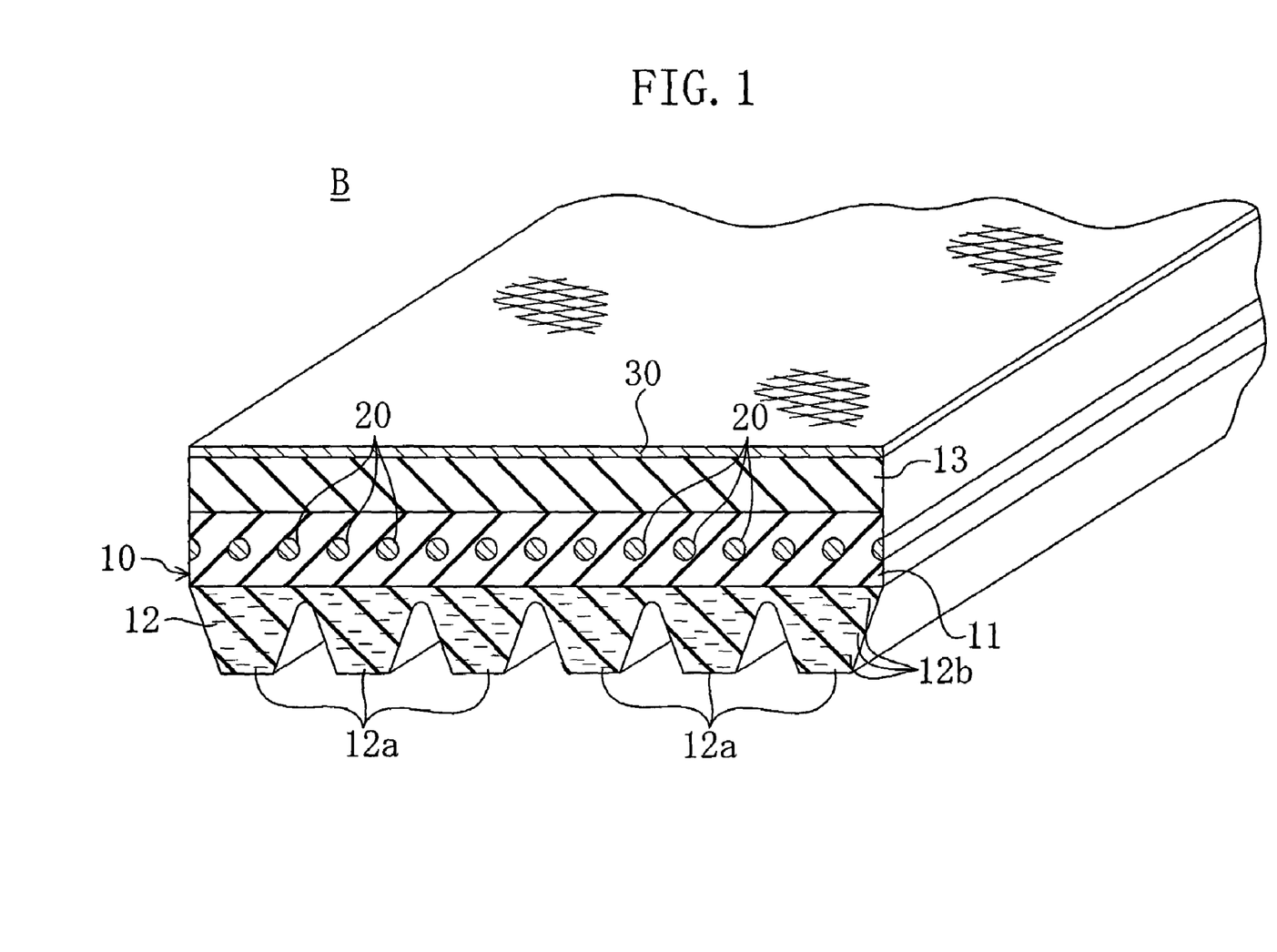
FIG. 1 is a perspective view of a V-ribbed belt according to Embodiment 1 of the present invention.

FIG. 1 shows a V-ribbed belt B according to Embodiment 1.

This V-ribbed belt B has a V-ribbed belt body 10, a cord 20 embedded in the V-ribbed belt body 10 to form a spiral with certain pitches in the belt widthwise direction, and a reinforced fabric 30 disposed to cover the back face side of the V-ribbed belt body 10.

The V-ribbed belt body 10 is made of a rubber composition such as chloroprene rubber (CR) or ethylene propylene diene monomer rubber (EPDM). The V-ribbed belt body 10 has a structure in which an adhesion rubber layer 11 containing the cord 20 embedded therein, a rib rubber layer 12 located under the adhesion rubber layer 11, and a tension rubber layer 13 located over the adhesion rubber layer 11 to form a back face part of the belt are stacked into one. The rib rubber layer 12 located at the inner periphery side of the belt forms a part for coming into contact with the pulley to transmit power directly thereon. Therefore, in the rib rubber layer 12, ridge-like ribs 12a extending in the belt lengthwise direction are formed in parallel to each other and in alignment across the belt width, which ensures that the belt has a large surface area. The rib rubber layer 12 is reinforced by mixing therein short fibers 12b, such as aramid fibers or nylon fibers, oriented in the belt widthwise direction. Exposed ones of the short fibers 12b mixed into the rib rubber layer 12 protrude from the belt surface.

The cord 20 is formed of twist yarns of aramid fibers or polyester fibers. To provide the cord 20 with the property of adhesion to the V-ribbed belt body 10, it is subjected, prior to molding, to a series of treatments of soaking into a resorcinol-formaldehyde latex (RFL) liquid and heating, and/or a series of treatments of soaking into a rubber cement and drying.

Figure 2:
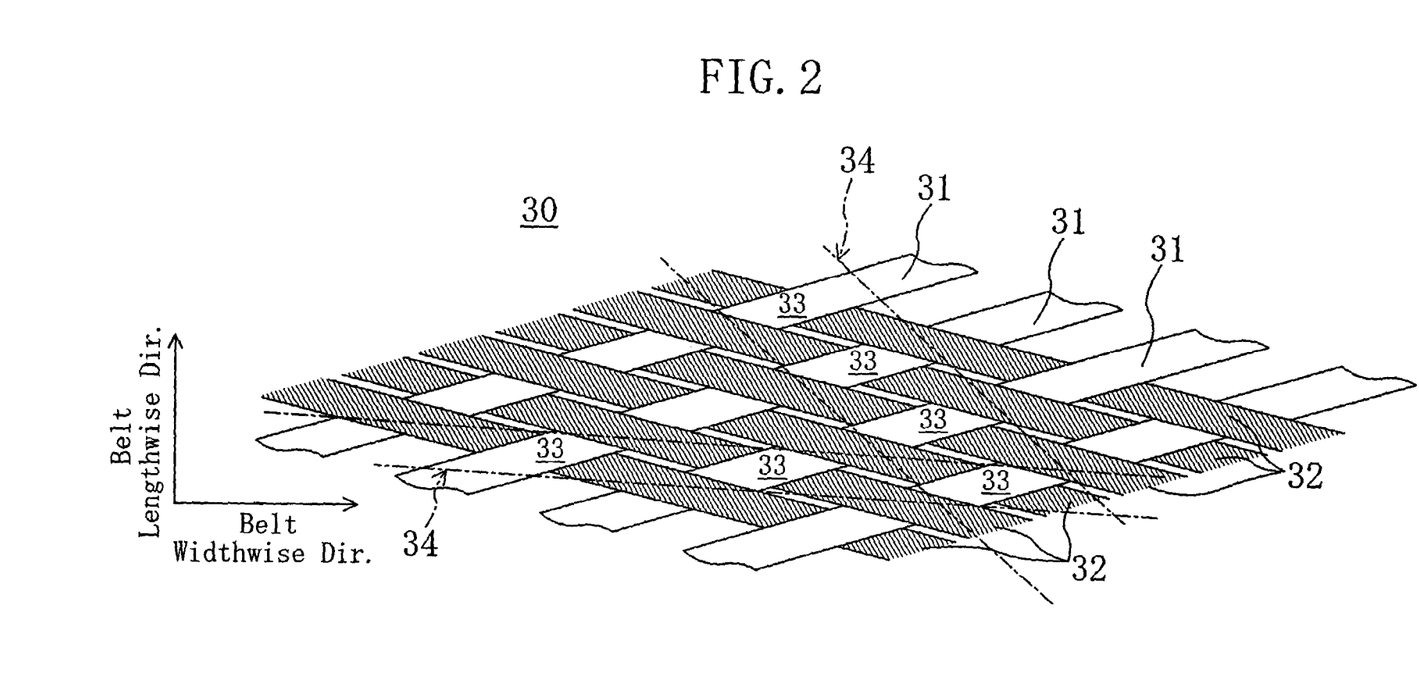
FIG. 2 is a schematic front view of a reinforced fabric in Embodiment 1.

As shown in FIG. 2, the reinforced fabric 30 is formed of a plain weave fabric consisting of warps 31 and wefts 32 in which ones are different in yarn density from the others (in FIG. 2, the weft 32 has a larger yarn density than the warp 31). Note that if the warp and weft yarns have the same diameter, one has a diameter 1.7 to 5.0 times as large as the other. And, the plain weave fabric is produced so that the angle formed by the directions of each pair of warp 31 and weft 32 is 100° or more (its supplementary angle is 80° or less). To provide the reinforced fabric 30 with the property of adhesion to the V-ribbed belt body 10, it is subjected, prior to molding, to a series of treatments of soaking into a resorcinol-formaldehyde latex (RFL) liquid and heating, a series of treatments of soaking into a rubber cement obtained by solving EPDM or the like in an organic solvent such as toluene and drying, a series of treatments of coating a rubber cement to its surface to be in contact with the V-ribbed belt body 10 and drying, or any possible combinations of them.

Figure 3:
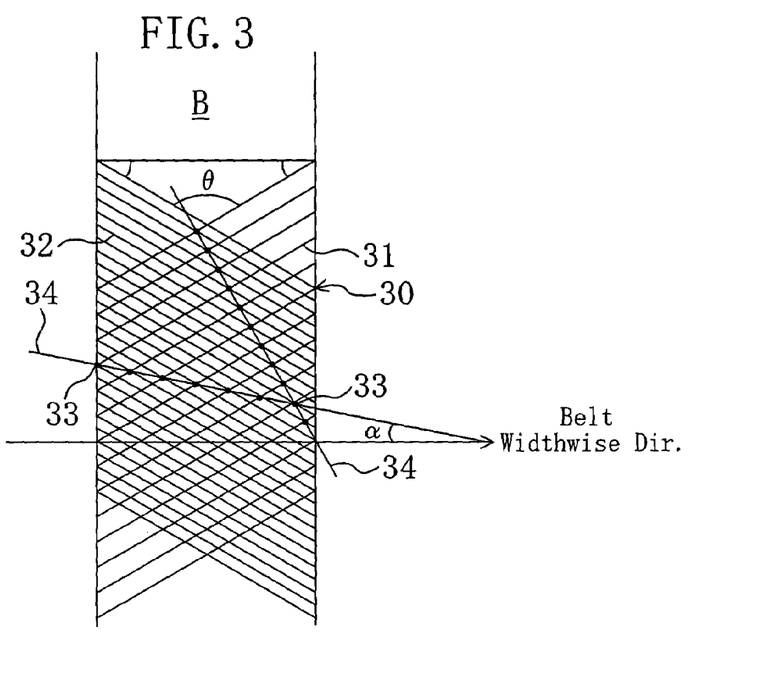
FIG. 3 is a schematic front view of the back face of the V-ribbed belt according to Embodiment 1.

As shown in FIG. 3, the reinforced fabric 30 is disposed at the belt back face so that the direction of the warps 31 and the direction of the wefts 32 make equal angles with respect to the belt widthwise direction. Since the warp 31 and the weft 32 differ in yarn density from each other, each of two directions of consecutive yarn intersections 33 of the warps 31 and wefts 32 formed to stand out from the belt surface, i.e., each of the directions in which lines of bulges 34 formed of the consecutive yarn intersections 33 extend, makes a certain angle with the belt widthwise direction. More specifically, the line of bulges 34 is a set of consecutive yarn intersections 33 on the diagonal line of grids formed by the warps 31 and wefts 32. Furthermore, there are two types of lines of bulges 34: those which extend obliquely upward to the left at a relatively large angle with the belt widthwise direction, and those which extend obliquely upward to the left at a relatively small angle with the belt widthwise direction. Between the two types of lines of bulges 34, those which have a smaller angle with the belt widthwise direction, i.e., the latter ones, have an angle ($\alpha$) of 5° to 20° therewith. Moreover, in this reinforced fabric 30, since the angle ($\theta$) formed by the directions of each pair of warp 31 and weft 32 is 100° or more, the directions of the pair of warp 31 and weft 32 each make an angle of less than 40° with the belt widthwise direction.

In the V-ribbed belt B of this embodiment, the two directions in which the lines of bulges 34 extend each make a certain angle with the belt widthwise direction. Therefore, when the belt back face comes into contact with the flat pulley, each line of bulges 34 makes gradual contact in its longitudinal direction with the flat pulley. Thus, unlike the conventional technique, the flat pulley is not beaten periodically by the lines of bulges 34, thereby preventing the occurrence of abnormal noises between the belt back face and the flat pulley. In addition, in this embodiment, the reinforced fabric 30 is disposed at the belt back face so that the direction of the warps 31 and the direction of the wefts 32 make equal angles with the belt widthwise direction. Therefore, the action of the V-ribbed belt B traveling in the direction of the warps 31 and the action of the V-ribbed belt B traveling in the direction of the wefts 32 counteract each other, thereby suppressing the occurrence of belt side tracking.

Furthermore, since the smaller one ($\alpha$) of the angles that the directions of the lines of bulges 34 make with the belt widthwise direction is 5° or more, each line of bulges 34 has a strong tendency to make gradual contact in its longitudinal direction with the flat pulley, whereby the contact is made smoothly. Therefore, noises themselves during belt run can be suppressed to a small extent. In addition, since the angle ($\alpha$) is not more than 20°, this suppresses side tracking of the moving belt in the belt widthwise direction.

Moreover, since each of the directions of the warp 31 and the weft 32 makes an angle of less than 40° with the belt widthwise direction, the belt flexural property, i.e., the belt flexural stiffness, can be suppressed to a small extent. Therefore, the belt reduces bending loss to obtain a high power transmission efficiency and less heat production. As a result, the V-ribbed belt B has an excellent flexural fatigue resistance.

The above V-ribbed belt B can be fabricated by known belt fabrication methods.

Figure 4:
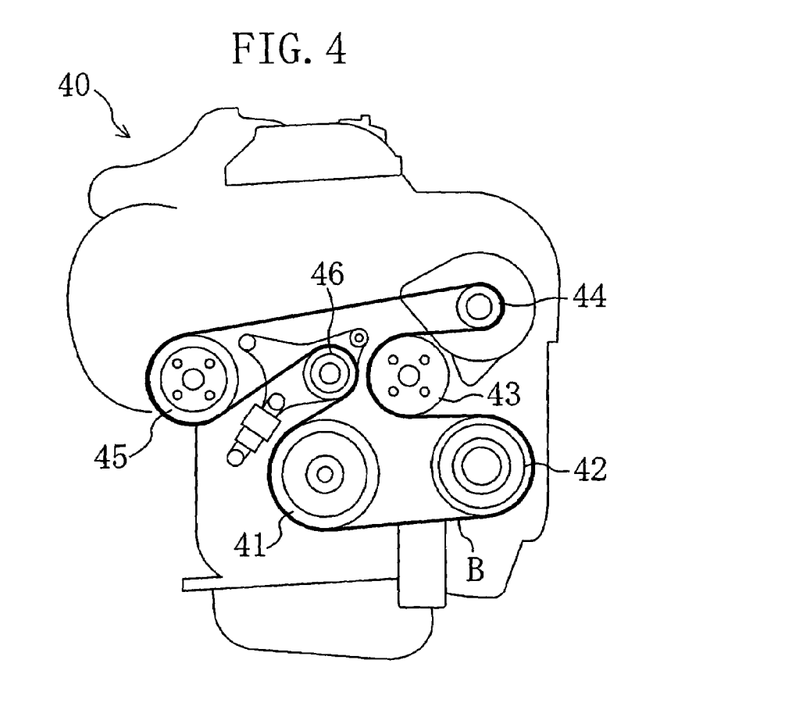
FIG. 4 illustrates the layout of an accessory belt drive system according to Embodiment 1.

FIG. 4 shows the layout of an accessory belt drive system 40 of the serpentine drive type in an automotive engine using the V-ribbed belt B.

This layout of the accessory belt drive system 40 is formed by a crank shaft pulley 41, an air conditioner pulley 42, a water pump pulley 43, an alternator pulley 44, a power steering pulley 45, and a tensioner pulley 46. Among these pulleys, those other than the tensioner pulley 46 and the water pump pulley 43, which are both flat pulleys, are all ribbed pulleys. The V-ribbed belt B is wound around the crank shaft pulley 41, the air conditioner pulley 42, the alternator pulley 44 and the power steering pulley 45 to make contact with the belt ribbed surface, and wound around the water pump pulley 43 and the tensioner pulley 46 to make contact with the belt back face.

Since the above V-ribbed belt B is used in this accessory belt drive system 40, when the back face of the moving belt comes into contact with the tensioner pulley 46 and the water pump pulley 43 as flat pulleys, each line of bulges 34 constituted by the yarn intersections 33 of the warps 31 and wefts 32 makes gradual contact in its longitudinal direction with the pulleys. Therefore, unlike the conventional technique, the pulleys are not beaten periodically by the lines of bulges 34, thereby preventing the occurrence of abnormal noises between the belt back face and each of the tensioner pulley 46 and the water pump pulley 43.

In the accessory belt drive system 40 of this embodiment, the reinforced fabric 30 is disposed at the belt back face so that the direction of the warps 31 and the direction of the wefts 32 make equal angles with the belt widthwise direction. Therefore, the action of the V-ribbed belt B traveling in the direction of the warps 31 and the action of the V-ribbed belt B traveling in the direction of the wefts 32 counteract each other, thereby suppressing the occurrence of belt side tracking.

Embodiment 2

Figure 5:
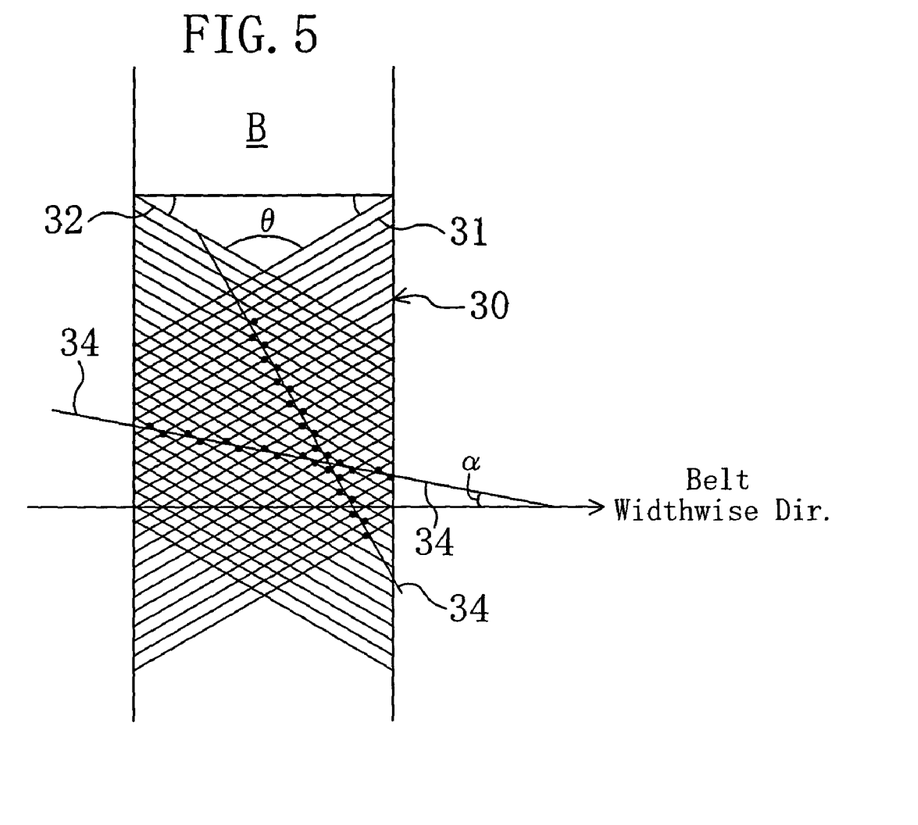
FIG. 5 is a schematic front view of the back face of a V-ribbed belt according to Embodiment 2 of the present invention.

FIG. 5 shows the back face of a V-ribbed belt B according to Embodiment 2. Note that the same reference characters refer to the same parts as in Embodiment 1.

Figure 6:
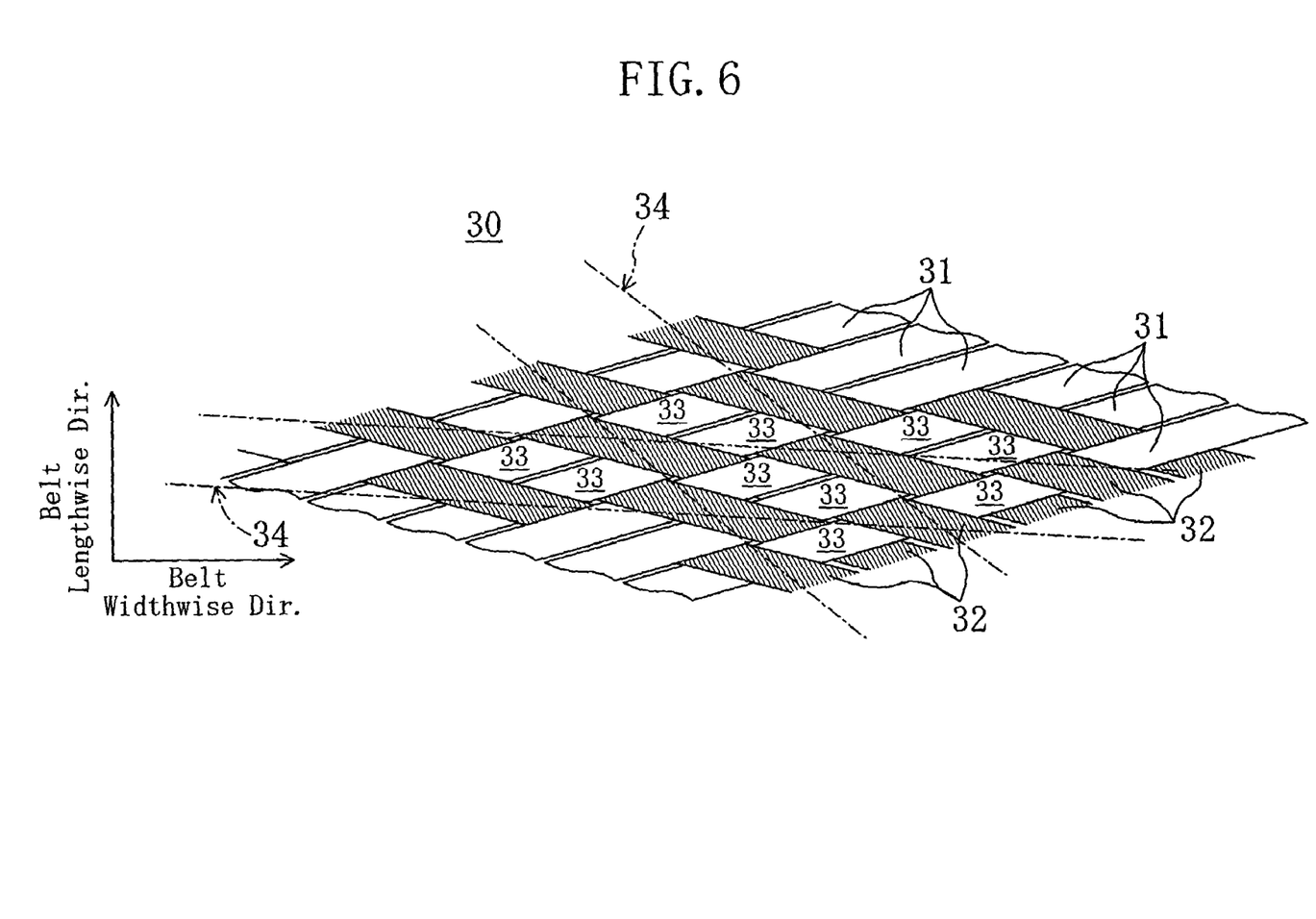
FIG. 6 is a schematic front view of a reinforced fabric in Embodiment 2.

As shown in FIG. 6, the reinforced fabric 30 of the V-ribbed belt B is formed of a rib weave fabric produced so that the angle formed by the directions of each pair of warp 31 and weft 32 is 100° or more (its supplementary angle is 80° or less). To provide the reinforced fabric 30 with the property of adhesion to the V-ribbed belt body 10, it is subjected, prior to molding, to a series of treatments of soaking into a resorcinol-formaldehyde latex (RFL) liquid and heating, a series of treatments of soaking into a rubber cement and drying, a series of treatments of coating a rubber cement to its surface to be in contact with the V-ribbed belt body 10 and drying, or any possible combinations of them. The rib weave fabric forming the reinforced fabric 30 is woven in weft rib weave that has a pattern in which the wefts 32 appear alternately on the front and back of the textile for every two warps 31 and another pattern in which the adjacent wefts 32 appear alternately on the front and back of the textile for every two warps 31 in the reversed manner. Needless to say, the reinforced fabric 30 may be woven in warp rib weave that has a pattern in which the warps 31 appear alternately on the front and back of the textile for every two wefts 32 and another pattern in which the adjacent warps 31 appear alternately on the front and back of the textile for every two wefts 32 in the reversed manner. As shown in FIG. 5, the reinforced fabric 30 is disposed at the belt back face so that the direction of the warps 31 and the direction of the wefts 32 make equal angles with the belt widthwise direction. Since a rib weave fabric is used as the reinforced fabric 30, each of two directions of consecutive yarn intersections 33 of the warps 31 and wefts 32 formed to stand out from the belt surface, i.e., each of the directions in which lines of bulges 34 extend, makes a certain angle with the belt widthwise direction. In this case, there are two types of lines of bulges 34: those which extend obliquely upwardly leftward at a relatively large angle with the belt widthwise direction, and those which extend obliquely upwardly leftward at a relatively small angle with the belt widthwise direction. Between the two types of lines of bulges 34, those which have a smaller angle with the belt widthwise direction, i.e., the latter ones, have an angle ($\alpha$) of 5° to 20° therewith. Furthermore, in this reinforced fabric 30, the angle ($\theta$) formed by the directions of each pair of warp 31 and weft 32 is 100° or more. Therefore, the directions of the warp 31 and the weft 32 each make an angle of less than 40° with the belt widthwise direction.

The other structures are the same as those of Embodiment 1.

The V-ribbed belt B of this embodiment is also applicable to an accessory belt drive system 40 of the serpentine drive type in an automotive engine, like the V-ribbed belt of Embodiment 1.

The behaviors and effects are the same as those of Embodiment 1.

Other Embodiments

Though Embodiments 1 and 2 have described V-ribbed belts B, the present invention is not limited thereto. Included in power transmission belts of the present invention are any power transmission belts in which the back face side of a belt body is covered with a reinforced fabric, such as a V-belt.

Test Evaluations (Test Evaluation 1)

<Test Evaluation Belt>

Prepared were reinforced fabrics formed of plain weave fabrics of eight types that are different from one another in the yarn densities of the warp and weft. Then, V-ribbed belts made of EPDM using the respective reinforced fabrics were fabricated. At the time, the back face of each V-ribbed belt is covered with the reinforced fabric so that the direction of the warps and the direction of the wefts have equal angles with the belt widthwise direction. The resultant eight V-ribbed belts differed from one another in the angle that each of two directions of consecutive yarn intersections of the warps and wefts formed to stand out from the belt surface, i.e., each of the directions in which lines of bulges formed of the yarn intersections extend, makes with the belt widthwise direction. The eight V-ribbed belts were used as test evaluation belts.

<Test Evaluation Method>

The eight test evaluation belts were run, under the same conditions, over a belt drive system which is provided with a flat pulley making contact with the belt back face, and their maximum sound pressures were measured during belt run.

<Test Evaluation Results>

Figure 7:
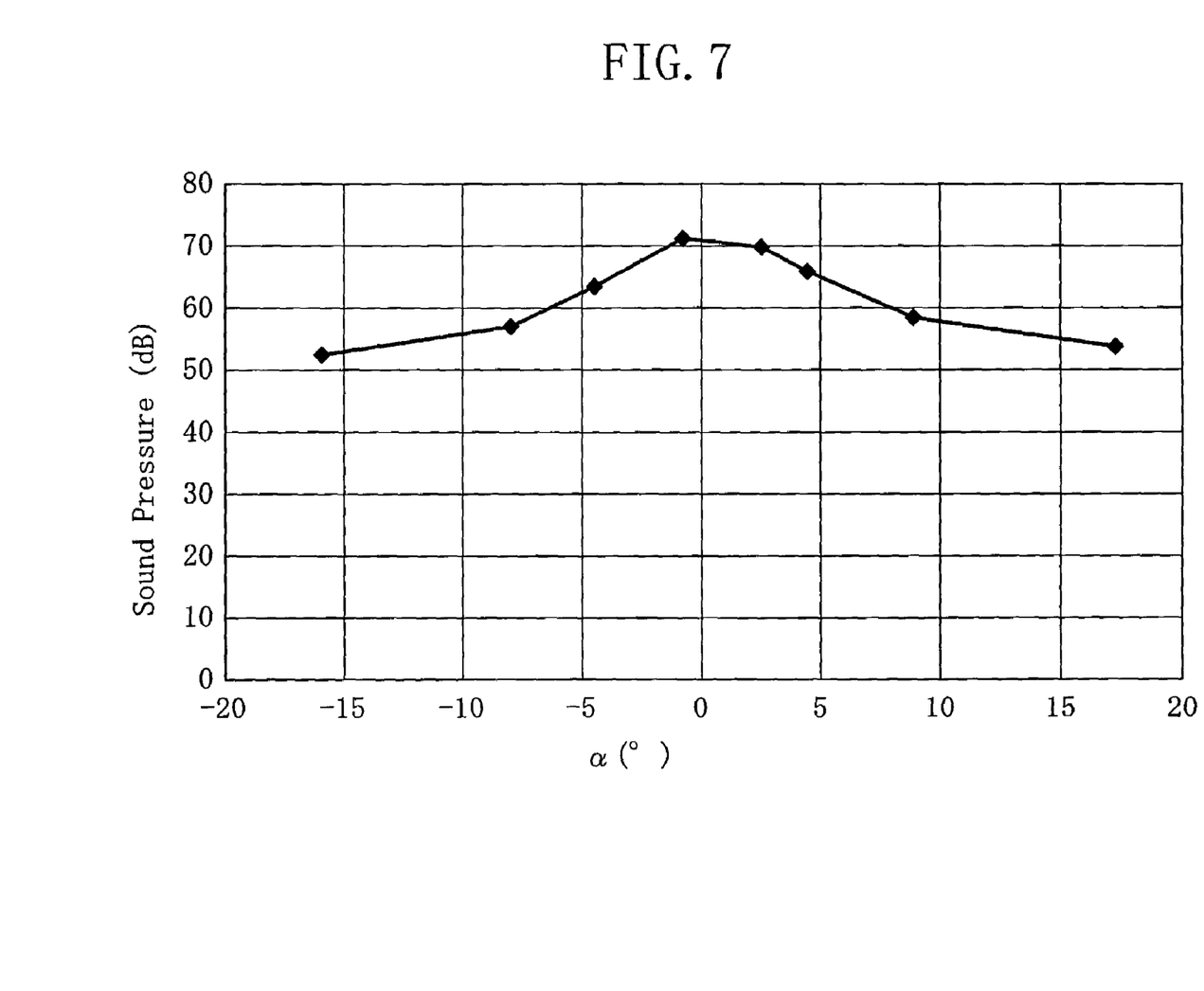
FIG. 7 is a graph showing the relation between the angle (α) of the direction in which lines of bulges extend with respect to the belt widthwise direction and peak sound pressure.

FIG. 7 shows the relation between the smaller one ($\alpha$) of the angles that two directions of lines of bulges make with the belt widthwise direction and peak sound pressure. In the figure, when the belt back face is viewed from the front with the belt running upward, the negative sign of the angle ($\alpha$) indicates that the direction of lines of bulges is upward to the right, while the positive sign of the angle ($\alpha$) indicates that the direction of lines of bulges is downward to the right. When the angle that the direction of lines of bulges makes with the belt widthwise direction is 0°, this means that the former matches the latter.

As seen from FIG. 7, when the direction of lines of bulges matches the belt widthwise direction, the peak sound pressure reaches a maximum value. This is probably because in the case where the direction of lines of bulges matches the belt widthwise direction, the sounds produced by the lines of bulges periodically beating the pulley are observed as particular peak sound pressure levels.

Further, it can be seen from FIG. 7 that as the angle ($\alpha$) which the direction of lines of bulges makes with the belt widthwise direction is increased, sound becomes smaller. This is probably because in the case where the angle ($\alpha$) which the direction of lines of bulges makes with the belt widthwise direction is increased, the lines of bulges have a stronger tendency to make gradual contact in their lengthwise directions with the flat pulley, whereby the contact is made smoothly and therefore sounds themselves during belt run can be suppressed to a small extent.

When the angle ($\alpha$) is in the range from 0° to 5° or 8°, the peak sound pressure level is reduced to a relatively great extent. However, even if the angle ($\alpha$) is increased over the range, the peak sound pressure level is not reduced to a much greater extent. Therefore, it is desirable that the angle ($\alpha$) which the direction of lines of bulges makes with the belt widthwise direction is at least 5°, preferably at least 8°. Note that in consideration of preventing large belt side tracking in the belt widthwise direction during belt run, the angle ($\alpha$) is preferably 20° or less.

(Test Evaluation 2)

<Test Evaluation Belt>

V-ribbed belts as shown in the following examples were fabricated. The structures of these belts are also shown in Table 1.

EXAMPLE 1

As a reinforced fabric, use was made of a plain weave fabric which is formed of mutually crosswise ($\beta$=90°) running warps and wefts each made by twisting two 300-dtex polyester/cotton blended yarns and has a warp yarn density of 90 yarns/5 cm and a weft yarn density of 50 yarns/5 cm. A V-ribbed belt of EPDM (having seven ribs) was fabricated as Example 1 by covering the belt back face with the reinforced fabric so that each of the directions of the warp and the weft makes an angle of 45° with the belt widthwise direction. In the back face of Example 1 V-ribbed belt, between angles that two directions of consecutive yarn intersections of the warps and wefts formed to stand out from the belt surface, i.e., two directions in which lines of bulges formed of the yarn intersections extend, make with the belt widthwise direction, the smaller angle ($\alpha$) was 7°, and the pitch of the lines of bulges was 0.86 mm.

EXAMPLE 2

As a reinforced fabric, use was made of a weft rib weave fabric which is formed of mutually crosswise ($\beta$=90°) running warps and wefts each made by twisting two 300-dtex polyester/cotton blended yarns and has a warp yarn density of 90 yarns/5 cm and a weft yarn density of 90 yarns/5 cm. A V-ribbed belt of EPDM (having seven ribs) was fabricated as Example 2 by covering the belt back face with the reinforced fabric so that each of the directions of the warp and the weft makes an angle of 45° with the belt widthwise direction. In the back face of Example 2 V-ribbed belt, between angles that two directions in which lines of bulges extend make with the belt widthwise direction, the smaller angle ($\alpha$) was 14°, and the pitch of the lines of bulges was 1.17 mm.

EXAMPLE 3

As a reinforced fabric, use was made of a plain weave fabric having the same structure as the reinforced fabric in Example 1 except that the angle ($\beta$) formed by the directions of warps and wefts was 120°. A V-ribbed belt of EPDM (having seven ribs) was fabricated as Example 3 by covering the belt back face with the reinforced fabric so that each of the directions of the warp and the weft makes an angle of 30° with the belt widthwise direction. In the back face of Example 3 V-ribbed belt, between angles that two directions in which lines of bulges extend make with the belt widthwise direction, the smaller angle ($\alpha$) was 8°, and the pitch of the lines of bulges was 0.95 mm.

EXAMPLE 4

As a reinforced fabric, use was made of a weft rib weave fabric having the same structure as the reinforced fabric in Example 2 except that the angle ($\beta$) formed by the directions of warps and wefts was 120°. A V-ribbed belt of EPDM (having seven ribs) was fabricated as Example 4 by covering the belt back face with the reinforced fabric so that each of the directions of the warp and the weft makes an angle of 30° with the belt widthwise direction. In the back face of Example 4 V-ribbed belt, between angles that two directions in which lines of bulges extend make with the belt widthwise direction, the smaller angle ($\alpha$) was 8.5°, and the pitch of the lines of bulges was 0.95 mm.

EXAMPLE 5

As a reinforced fabric, use was made of a plain weave fabric which is formed of mutually crosswise ($\beta=90°$) running warps and wefts each made by twisting two 300-dtex polyester/cotton blended yarns and has a warp yarn density of 80 yarns/5 cm and a weft yarn density of 80 yarns/5 cm. A V-ribbed belt of EPDM (having seven ribs) was fabricated as Example 5 by covering the belt back face with the reinforced fabric so that each of the directions of the warp and the weft makes an angle of 45° with the belt widthwise direction. In the back face of Example 5 V-ribbed belt, one of two directions in which lines of bulges extend matched the belt widthwise direction, and the pitch of the lines of bulges was 0.88 mm.

EXAMPLE 6

As a reinforced fabric, use was made of a plain weave fabric having the same structure as the reinforced fabric in Example 5 except that the fabric has a warp yarn density of 90 yarns/5 cm and a weft yarn density of 90 yarns/5 cm and that the angle ($\beta$) formed by the directions of warps and wefts was 120°. A V-ribbed belt (having seven ribs) was fabricated as Example 6 by covering the belt back face with the reinforced fabric. In the back face of Example 6 V-ribbed belt, one of two directions in which lines of bulges extend matched the belt widthwise direction, and the pitch of the lines of bulges was 0.63 mm.

TABLE I

|  | Ex. 1 | Ex. 2 | Ex. 3 | Ex. 4 | Ex. 5 | Ex. 6 |
| --- | --- | --- | --- | --- | --- | --- |
| Warp yarn type | Polyester/Cotton Blended | Polyester/Cotton Blended | Polyester/Cotton Blended | Polyester/Cotton Blended | Polyester/Cotton Blended | Polyester/Cotton Blended |
| Weft yarn type | Polyester/Cotton Blended | Polyester/Cotton Blended | Polyester/Cotton Blended | Polyester/Cotton Blended | Polyester/Cotton Blended | Polyester/Cotton Blended |
| Warp weight (dtex/2s) | 300 | 300 | 300 | 300 | 300 | 300 |
| Weft weight (dtex/2s) | 300 | 300 | 300 | 300 | 300 | 300 |
| Weave | Plain | Rib | Plain | Rib | Plain | Plain |
| Warp density (yarns/5 cm) | 90 | 90 | 90 | 90 | 80 | 90 |
| Weft density (yarns/5 cm) | 50 | 90 | 50 | 90 | 80 | 90 |
| Bulge line pitch (mm) | 0.86 | 1.17 | 0.95 | 0.95 | 0.88 | 0.63 |
| $\alpha$ (degrees) | 7 | 14 | 8 | 8.5 | 0 | 0 |
| $\beta$ (degrees) | 90 | 90 | 120 | 120 | 90 | 120 |
| Belt material | EPDM | EPDM | EPDM | EPDM | EPDM | EPDM |
| Periodic sound pressure peak (dB) | Null | Null | Null | Null | 70.8 | 61.3 |
| Frequency at sound pressure peak (Hz) | Null | Null | Null | Null | 7000 | 9630 |
| Durability | 98 | 101 | 109 | 112 | 100 | 108 |

<Test Evaluation Method>

Sound Test During Belt Run

Figure 8:
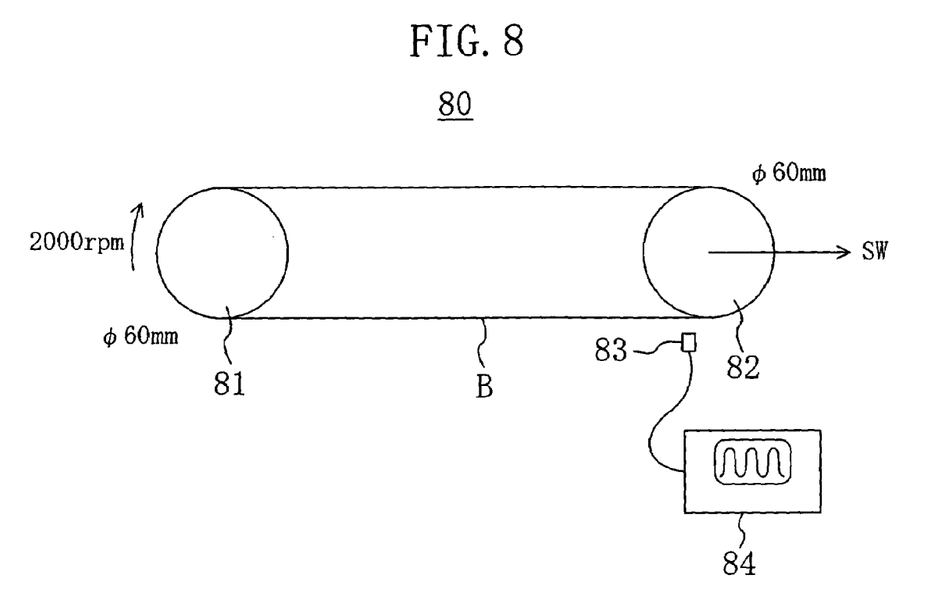
FIG. 8 illustrates the layout of a belt run tester for a sound test.

As shown in FIG. 8, a belt run tester 80 used in this test includes a drive pulley 81 and a driven pulley 82 which are a pair of 60 mm diameter flat pulleys spaced away from each other. A microphone 83 for sound pickup is placed at a position 20 mm away from a belt delivery part of the driven pulley 82, and is connected to analysis equipment 84 for sound analysis.

In a run test, each of the V-ribbed belts B of the above examples was wound around the drive pulley 81 and the driven pulley 82 of the belt run tester 80 to allow the belt back face to come into contact with the pulley surfaces, a load was imposed on the driven pulley 82 by a set weight SW of 686 N to pull the driven pulley 82 backward, and the drive pulley 81 was then rotated at 2000 rpm. Under these conditions, sounds during the belt run were picked up by the microphone 83 and the sounds picked up were analyzed by the analysis equipment 84.

Belt Durability Test

Figure 9:
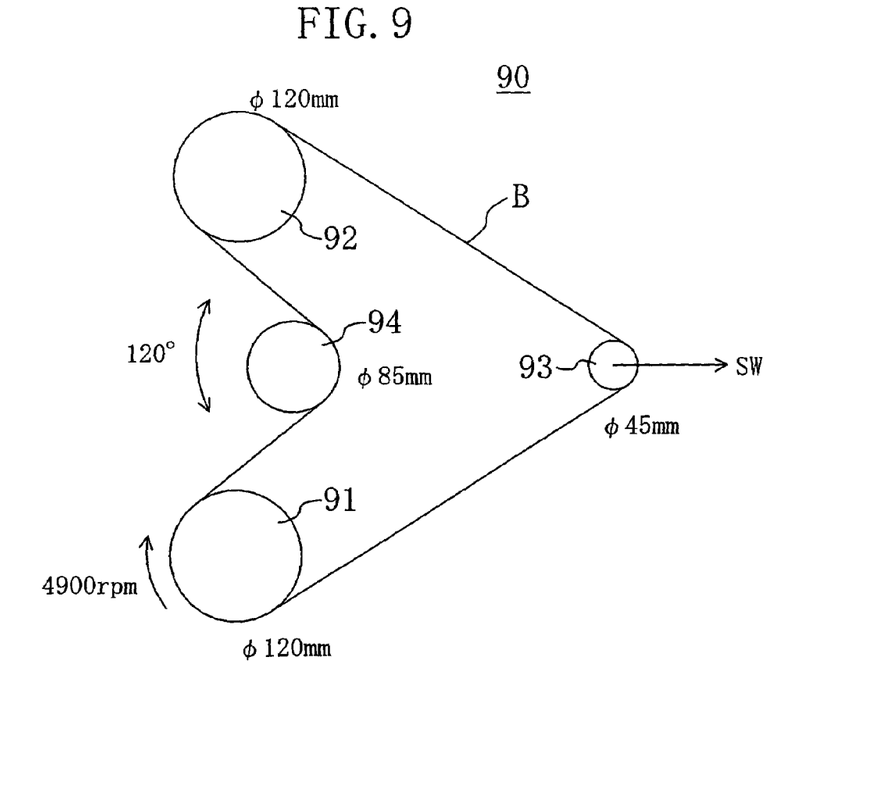
FIG. 9 illustrates the layout of a belt run tester for a belt durability test.

As shown in FIG. 9, a belt run tester 90 used in this test includes a drive pulley 91 which is a 120 mm diameter ribbed pulley, a first driven pulley 92 which is a 120 mm diameter ribbed pulley disposed above the drive pulley 91, a second driven pulley which is a 45 mm diameter ribbed pulley disposed rightward of and at a height intermediate the drive and first driven pulleys 91 and 92, and an idler pulley 94 which is a 85 mm diameter flat pulley disposed at the same height as the second driven pulley 93, to the upper right of the drive pulley 91 and to the lower right of the first driven pulley 92 to form a belt winding angle of 120°.

In a run test, each of the V-ribbed belts B of the above examples was wound around the drive pulley 91 and the first and second driven pulleys 92 and 93 of the belt run tester 90 to allow the ribs to come into contact with the pulley surfaces, and also wound around the idler pulley 94 to allow the belt back face to come into contact with the pulley surface, a load was imposed on the second driven pulley 93 by a set weight SW of 559 N for every three ribs to pull the second driven pulley 93 backward, a 8.8 kW load was concurrently imposed on the first driven pulley 92, and the drive pulley 91 was rotated at 4900 rpm in an atmosphere of 100° C. Under these conditions, the time from the start of the run until the production of a crack in any one of the ribs was measured.

<Text Evaluation Results>

Sound Test During Belt Run

Figure 10:
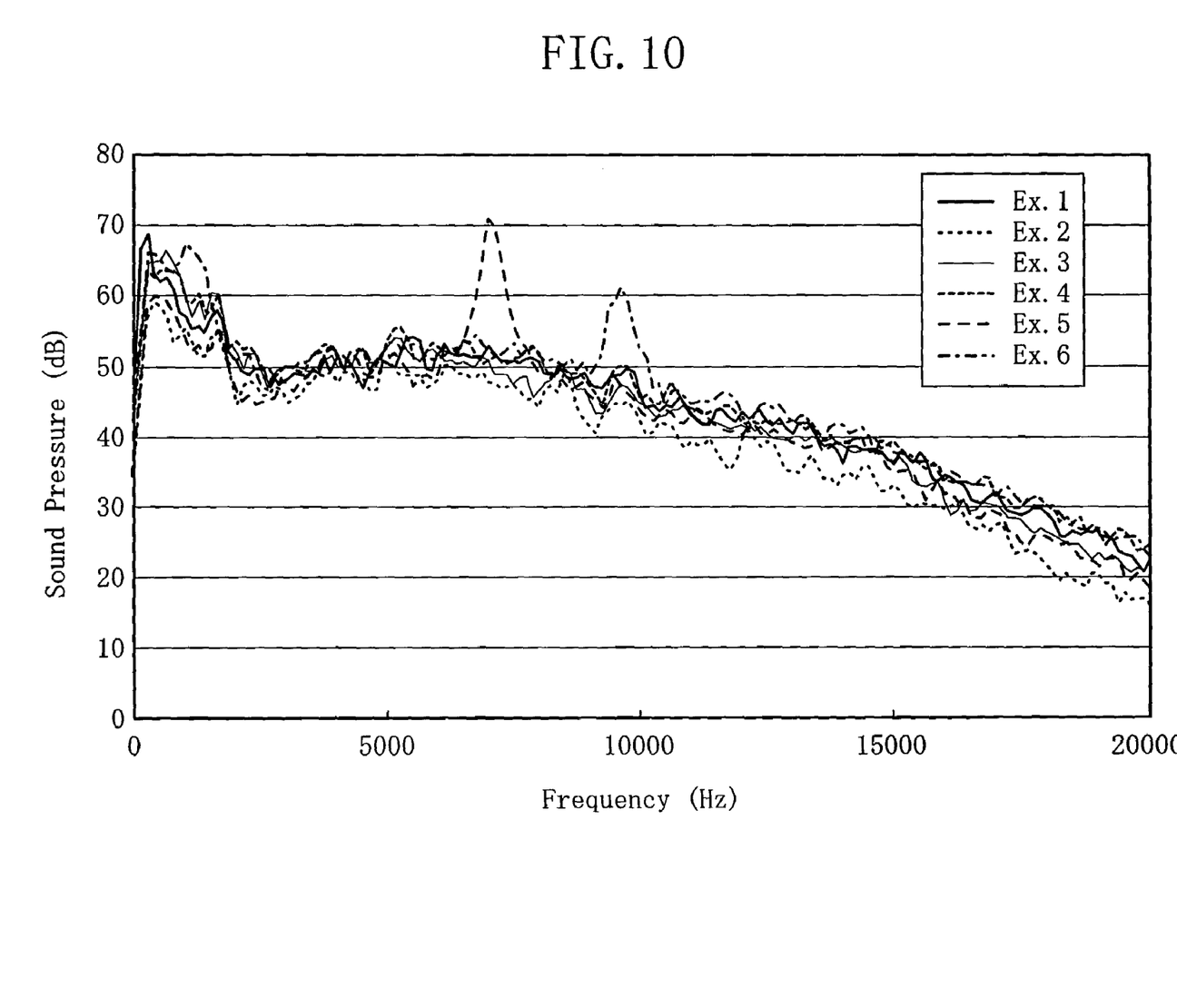
FIG. 10 is a graph showing the relation between sound frequency and sound pressure during belt run.

FIG. 10 shows the relation between sound frequency and sound pressure during belt run. The peak sound pressures of periodic sounds and the frequencies at sound pressure peaks are shown in Table 1.

According to FIG. 10 and Table 1, the general tendencies of Examples 1 to 6 approximate one another. It can be seen that in the case of Example 5, a particular prominent sound pressure peak of 70.8 dB exists at 7000 Hz, and in the case of Example 6, a particular prominent sound pressure peak of 61.3 dB exists at 9630 Hz. These peaks probably occur because in the cases of Examples 5 and 6, one of the directions in which the lines of bulges extend matches the belt widthwise direction and sounds produced by the lines of bulges in that direction periodically beating the pulley were observed. More specifically, in Example 5, since the pitch of the lines of bulges in that direction was 0.88 mm and the drive pulley of 60 mm diameter was rotated at 2000 rpm, there was obtained a calculation result that the lines of bulges periodically beat the pulley at a frequency of 7136 Hz. Likewise, in Example 6, since the pitch of the lines of bulges in that direction is 0.63 mm, the lines of bulges periodically beat the pulley at a frequency of 9967 Hz. Thus, the test results approximate the calculation results very much. By contrast, in each of Examples 1 to 4, the direction in which the lines of bulges extend makes a certain angle ($\alpha$) with the belt widthwise direction, and the lines of bulges make gradual contact in their lengthwise directions with the flat pulley, which suppresses periodic beating of the lines of bulges on the flat pulley. Therefore, it is considered that there exist no particular prominent sound pressure peak that would appear in the cases of Examples 5 and 6.

Comparison among Examples 1 to 4 shows that Example 2 is generally lower in sound pressure than the other examples. The reason for this is considered as follows. While the angle ($\alpha$) which the direction of lines of bulges makes with the belt widthwise direction in Example 2 is 14°, the angles ($\alpha$) in Examples 1, 3 and 4 are 7°, 8° and 8.5°, respectively. Like the case of Test Evaluation 1, as the angle ($\alpha$) which the direction of lines of bulges makes with the belt widthwise direction is increased, the lines of bulges have a stronger tendency to make gradual contact in their lengthwise direction with the flat pulley, whereby the contact is made more smoothly and therefore sounds themselves during belt run can be suppressed to a smaller extent.

Belt Durability Test

The belt lives of the examples are relatively shown in Table 1 in which the run time of Example 5 is set at a reference value of 100.

Reference to Table 1 shows that in point of belt durability, Example 3, which uses the reinforced fabric in which the angle ($\beta$) formed by the directions of warps and wefts is 120°, i.e., the angle that each of the warp and weft makes with the belt widthwise direction is 30°, is superior to Example 1, which uses the reinforced fabric in which the angle ($\beta$) formed by the directions of warps and wefts is 90°, i.e., the angle that each of the warp and weft makes with the belt widthwise direction is 45°. The same goes for comparison between Examples 2 and 4. Also, though different in the warp and weft yarn densities from Examples 1 to 4, the same goes for comparison between Examples 5 and 6. The reason for this is considered as follows. The smaller the angle that each of the warp and weft makes with the belt widthwise direction is, the lower the belt flexural property or the belt flexural stiffness becomes, and therefore the less the bending loss is produced. Therefore, the V-ribbed belt obtains a high power transmission efficiency and produces less heat. As a result, the V-ribbed belt has an excellent flexural fatigue resistance.

The foregoing discloses and describes merely exemplary embodiments of the present invention. One skilled in the art will readily recognize, from such discussion and accompanying drawings and claims, that various changes, modifications and variations can be made therein without departing from the spirit and scope of the present invention.

What is claimed is:

1. A power transmission belt in which the back face side of a belt body is covered with a reinforced fabric woven with warps and wefts, wherein the reinforced fabric, the direction of warps and the direction of wefts make equal angles with a widthwise direction of the belt, and intersections of said warps and wefts stand out from the belt surface, and wherein between a larger and a smaller angle that the two directions of consecutive yarn intersections of the warps and wefts make across the widthwise direction of the belt, the smaller angle is 5° to 20° inclusive, and the larger angle is non-parallel to a longitudinal axis of the belt to prevent noise generation when said belt is in operation.

2. The power transmission belt of claim 1, wherein between the angles that the two directions of consecutive yearn intersections of the warps and wefts formed to strand out from the belt surface make with the widthwise direction of the belt, the smaller angle is 5° to 20° inclusive.

3. The power transmission belt of claim 1, wherein the reinforced fabric is formed of a woven fabric in which warps are different in yarn density from wefts.

4. The power transmission belt of claim 1, wherein the reinforced fabric is formed of a rib weave fabric.

5. The power transmission belt of claim 1, wherein each of the angles that the direction of warps and the direction of wefts make with the widthwise direction of the belt is smaller than 40°.

6. The power transmission belt of claim 1, wherein the belt body is a body of a V-ribbed belt.

* * * * *

UNITED STATES PATENT AND TRADEMARK OFFICE
CERTIFICATE OF CORRECTION

PATENT NO. : 7,052,425 B2 Page 1 of 1
APPLICATION NO. : 10/673222
DATED : May 30, 2006
INVENTOR(S) : Yuji Nakamoto et al.

It is certified that error appears in the above-identified patent and that said Letters Patent is hereby corrected as shown below:

What is claimed is:

Column 12, line 60 "yearn" should read --yarn--.

Signed and Sealed this

Second Day of January, 2007

JON W. DUDAS
*Director of the United States Patent and Trademark Office*